United States Patent
Suzuki et al.

(10) Patent No.: US 9,550,254 B2
(45) Date of Patent: Jan. 24, 2017

(54) PURE AR GAS SHIELDED WELDING MIG FLUX-CORED WIRE AND MIG ARC WELDING METHOD

(75) Inventors: Reiichi Suzuki, Fujisawa (JP); Yu Umehara, Fujisawa (JP); Toshihiko Nakano, Fujisawa (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 1576 days.

(21) Appl. No.: 12/417,849

(22) Filed: Apr. 3, 2009

(65) Prior Publication Data
US 2009/0261085 A1 Oct. 22, 2009

(30) Foreign Application Priority Data
Apr. 16, 2008 (JP) ................................. 2008-107197

(51) Int. Cl.
*B23K 35/02* (2006.01)
*B23K 35/30* (2006.01)
(Continued)

(52) U.S. Cl.
CPC ........... *B23K 35/3053* (2013.01); *B23K 9/173* (2013.01); *B23K 35/0244* (2013.01);
(Continued)

(58) Field of Classification Search
CPC ................................. B23K 35/30; B23K 35/02
(Continued)

(56) References Cited

U.S. PATENT DOCUMENTS

| 4,800,131 | A | * | 1/1989 | Marshall et al. | ............. 428/558 |
| 6,596,971 | B1 | * | 7/2003 | Biskup | ................... B23K 9/173 |
| | | | | | 219/137 WM |

(Continued)

FOREIGN PATENT DOCUMENTS

| CN | 101151120 A | 3/2008 |
| EP | 1 930 112 A1 | 6/2008 |

(Continued)

OTHER PUBLICATIONS

U.S. Appl. No. 12/905,480, filed Oct. 15, 2010, Suzuki.
(Continued)

*Primary Examiner* — Dana Ross
*Assistant Examiner* — Ayub Maye
(74) *Attorney, Agent, or Firm* — Oblon, McClelland, Maier & Neustadt, L.L.P.

(57) ABSTRACT

A pure Ar-MIG welding wire for welding steel according to the present invention is formed of a flux-cored wire. The flux-cored wire is formed in the manner that a formation formed by welding a carbon steel hoop into a pipe shape or a seamless pipe is used as an outer sheath, the outer sheath is filled with a flux, and a wire drawing process is performed. The flux accounts for 7 to 27 mass % of the total wire mass. The wire contains graphite in the amount of 0.16 to 2.00 mass % on the basis of the total wire mass and iron powder in the amount of 20 mass % on the basis of the total flux mass. According to the construction, neither expensive metal resource nor a greenhouse effect gas is used, slag and fume generation is inhibited, and a weld joint having a high static tensile strength and fatigue strength can be obtained.

6 Claims, 4 Drawing Sheets

(51) Int. Cl.
*B23K 9/173* (2006.01)
*B23K 35/362* (2006.01)
*B23K 35/368* (2006.01)
*B23K 35/38* (2006.01)

(52) U.S. Cl.
CPC ........ *B23K 35/0266* (2013.01); *B23K 35/362* (2013.01); *B23K 35/368* (2013.01); *B23K 35/383* (2013.01)

(58) Field of Classification Search
USPC ................. 219/136, 137 WM, 145.22, 146.1
See application file for complete search history.

(56) References Cited

U.S. PATENT DOCUMENTS

| | | | | |
|---|---|---|---|---|
| 6,723,954 | B2* | 4/2004 | Nikodym | B23K 35/368 219/121.11 |
| 2003/0094444 | A1* | 5/2003 | Kato et al. | 219/145.22 |
| 2007/0108174 | A1* | 5/2007 | Narayanan et al. | 219/137 PS |
| 2008/0011720 | A1* | 1/2008 | Briand | B23K 26/1429 219/61 |

FOREIGN PATENT DOCUMENTS

| | | | | |
|---|---|---|---|---|
| EP | 2 289 661 A1 | | 3/2011 | |
| JP | 60-162594 | | 8/1985 | |
| JP | 62-161481 | | 7/1987 | |
| JP | 62161481 | A * | 7/1987 | ............... B23K 9/16 |
| JP | 3-221294 | | 9/1991 | |
| JP | 08290296 | A * | 11/1996 | ............. B23K 35/40 |
| JP | 2006-205204 | | 8/2006 | |
| JP | 2006-272405 | | 10/2006 | |
| JP | 2006272405 | A * | 10/2006 | |
| JP | 2007-44736 | | 2/2007 | |
| JP | 2007-296535 | | 11/2007 | |
| KR | 10-2007-0108558 | | 11/2007 | |

OTHER PUBLICATIONS

Office Action issued Feb. 1, 2011, in China Patent Application No. 200910133896.X (with English translation).
U.S. Appl. No. 13/085,966, filed Apr. 13, 2011, Yamazaki, et al.
U.S. Appl. No. 13/076,915, filed Mar. 31, 2011, Yamazaki, et al.
Office Action issued Apr. 18, 2011 in Korea Application No. 10-2009-0032909 (With English Translation).

\* cited by examiner

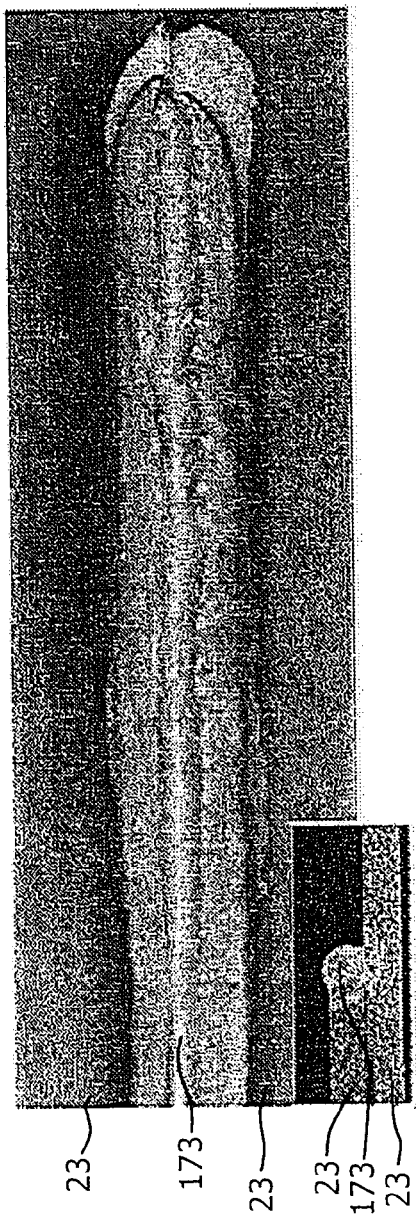 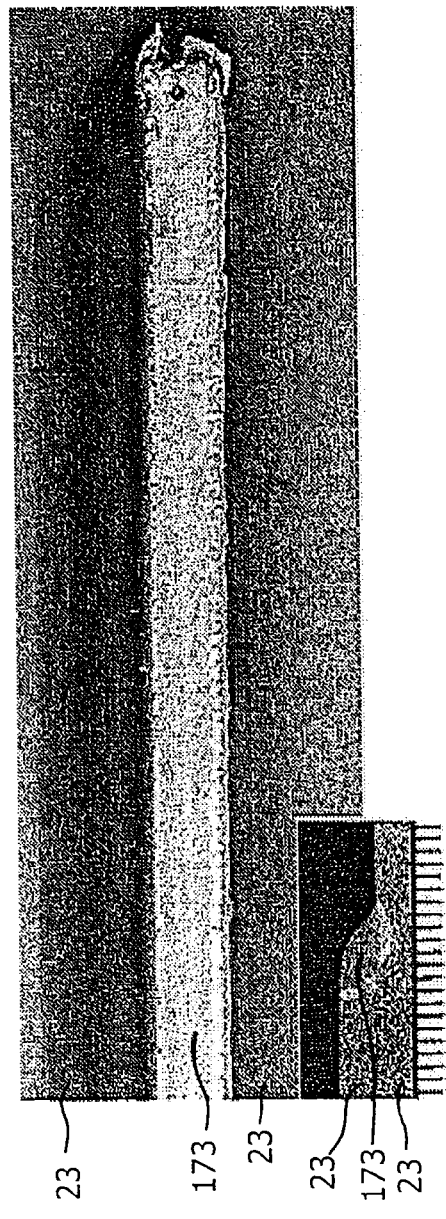

PURE AR GAS SHIELDED WELDING MIG FLUX-CORED WIRE AND MIG ARC WELDING METHOD

BACKGROUND OF THE INVENTION

1. Field of the Invention

The present invention relates to a pure Ar gas shielded welding MIG flux-cored wire and a MIG arc welding method. The wire is used to perform MIG arc welding of steel materials by use of pure Ar gas as shielding gas, and the method performs gas shielded arc welding while feeding the wire from a welding torch.

2. Description of the Related Art

Unlike the case where a base metal is an aluminum alloy metal, it has been considered that an inert gas arc welding method using pure argon is substantially impossible with gas shielded arc welding of steel materials. A reason is that in the case where the steel material is used as an electrode, electronic discharging requires an oxide having a low energy potential. With pure argon gas, an oxide is not formed either on a steel plate or wire end surface. Hence, generally, $CO_2$ alone or a mixture of Ar and either $CO_2$ or $O_2$ is used as shielding gas. However, in the case where oxidizing gases, such as $CO_2$ and $O_2$, exist, iron is inevitably oxidized in a molten state, and the property thereof is deteriorated thereby. Hence, a nonferrous element, such as Si, Mn, or Ti, which has a high affinity with oxygen is added from the wire, thereby to cause a deoxidation reaction for discharging the oxide as slag. More specifically, because oxidizing gases are used, expensive elements unnecessary for the joint performance are used. Further, while $CO_2$, which is most inexpensive, is most popularly used as shielding gas, $CO_2$ is known as a greenhouse effect gas, so that the gas should be restrained as much as possible from being used.

In comparison, in the case of welding using pure Ar gas as shielding gas, oxides, such as slags and fumes are not almost theoretically generated. Hence, improvement effects of failure in coating property caused in association with slag deposition or adverse effects on the human body because of fume sucking can be expected.

Thus, the pure Ar gas welding is advantageous in many viewpoints, such as nonuse of greenhouse effect gases, saving of valuable metal, improvement in weld bead appearance, and an improvement in welding-place hygiene environment. In the case of a TIG welding method in which tungsten, which is a nonconsumable electrode, is used, and a filler rod is molten by heat of arc generated between the electrode and the base metal, no resistance heat generation effect occurs while the pure Ar gas can be used. Hence, compared with the MAG welding and MIG welding methods in which arc is generated from the wire itself, the TIG welding method poses a drawback in that the efficiency is very low.

For example, as a pure Ar-MIG welding method for steel, a special welding wire formed by winding a steel band of different material around solid steel core is disclosed in Japanese Unexamined Patent Application Publication No. 2006-205204. Further, Japanese Unexamined Patent Application Publication No. 2007-44736 discloses a pseudo pure Ar welding method in which oxidizing gas is fed to flow around the pure Ar shielding gas by using a specially shaped torch. Further, Japanese Unexamined Patent Application Publication No. 2006-272405 discloses a welding method in which a flux-cored wire containing 0.10 to 0.70 mass % graphite and appropriate amounts of other elements are added to thereby improve the coating property associated with the amount of slag, and the martensite transformation temperature is reduced and a compression residual stress is imparted to thereby improve the joint fatigue strength.

However, in the case of the welding wire disclosed in Japanese Unexamined Patent Application Publication No. 2006-205204, the manufacture is difficult, also the composition contains large amounts of elements such as Ni and Cr, so that the wire is expensive, and the practicality thereof is low.

In the case of the welding torch disclosed in Japanese Unexamined Patent Application Publication No. 2007-44736, it is still within the conventionally known scope in that the oxidizing gas is used, and the welding torch is low in practicality because of its special shape.

In the case of the combination of the conventional shielding gas and the graphite disclosed in Japanese Unexamined Patent Application Publication No. 2006-27240, since the combination causes the generation of a large amount of fumes, the technique is undesirable for environment reasons. Further, since oxygen is fed from the shielding gas, the slag reduction effect is restrictive. Further, the oxygen content of the weld metal is as high as some 100 ppm, so that the reduction effect of a Ms point is restrictive. The Ms point refers to the temperature causing the start of transformation of austenite to martensite. Further, in the high C steel, there is a drawback in that the oxide being used as an inclusion is likely to cause solidification cracking.

SUMMARY OF THE INVENTION

The present invention is made in view of the problems described above. Accordingly, an object of the invention is to provide a pure Ar gas shielded welding MIG flux-cored wire and a MIG arc welding method. According to the wire and method, while a special torch, expensive metal resources, and greenhouse effect gas such as $CO_2$ do not have to be used, slag and fume generations are inhibited, and a weld joint having a high static tensile strength and fatigue strength can be obtained.

According to a first aspect of the present invention, there is provided a flux-cored wire to be used for MIG welding using a pure Ar shielding gas and to be formed with a steel outer sheath filled with a flux. The wire contains in the flux, graphite: 0.16 to 2.00 mass % on the basis of the total wire mass; and iron powder: 20 mass % or more on the basis of the total flux mass.

It is preferable that the wire further contains in the flux, at least one element selected from a group of Ti and Zr in an amount of 0.03 to 5.00 mass % on the basis of the total wire mass.

Further, it is preferable that the wire further contains, on the basis of the total wire mass, C: 0.16 to 2.00 mass %;
Si: 2.00 mass % or less;
Mn: 10.00 mass % or less;
Al: 1.00 mass % or less;
Mg: 1.00 mass % or less;
Ni: 3.00 mass % or less;
Cr: 3.00 mass % or less;
Nb: 3.00 mass % or less;
V: 3.00 mass % or less;
Mo: 3.00 mass % or less;
Cu: 3.00 mass % or less;
B: 0.0200 mass % or less;
rare earth metals (REM): 0.50 mass % or less;

F: 0.50 mass % or less;

Ca: 0.50 mass % or less;

K, Na, and Li: at least one element selected from a group of the elements having a total amount of 1.00 mass % or less;

P: 0.030 mass % or less as an impurity; and

S: 0.030 mass % or less as an impurity.

Further, it is preferable that, in the wire, the content of C is 0.45 to 2.00 mass % on the basis of the total wire mass.

According to a second aspect of the present invention, there is provided a MIG arc welding method, wherein MIG welding is executed in a manner that the flux-cored wire as defined in the first aspect is used, a pure Ar gas conforming to JIS K 1105 Class 1 or 2 is used as a shielding gas, and an arc is generated between the wire set to the positive pole and a base metal set to the negative pole.

In this case, it is preferable that a pulsed power source is used as a power source that forms the arc.

Further, it is preferable that the base metal is a steel sheet having a tensile strength of 490 MPa or more.

According to the present invention, conventional welding devices such as a torch can be used without being modified, and the wire compositions and shielding gases can be appropriately combined. Thereby, while greenhouse effect gases do not have to be used, and expensive metal resources do not have to be necessarily used, slag and fume generations can be inhibited. Hence, according to the present invention, a weld joint having a high static tensile strength and fatigue strength can be obtained. Consequently, low-cost and stable pure Ar-MIG welding for steel can be realized.

BRIEF DESCRIPTION OF THE DRAWINGS

The above and other objects, features and advantages of the present invention will become more apparent from the following description taken in connection with the accompanying drawings, in which:

FIG. 3A is top and side photographs showing a bead profile after pure Ar shielding gas MIG welding using a conventional welding wire;

FIG. 3B is top and side photographs showing a bead profile after pure Ar shielding gas MIG welding using a welding wire of the present invention;

DETAILED DESCRIPTION OF THE PREFERRED EMBODIMENTS

An embodiment of the present invention will be described in detail herebelow with reference to the accompanying drawings.

Figure 1:
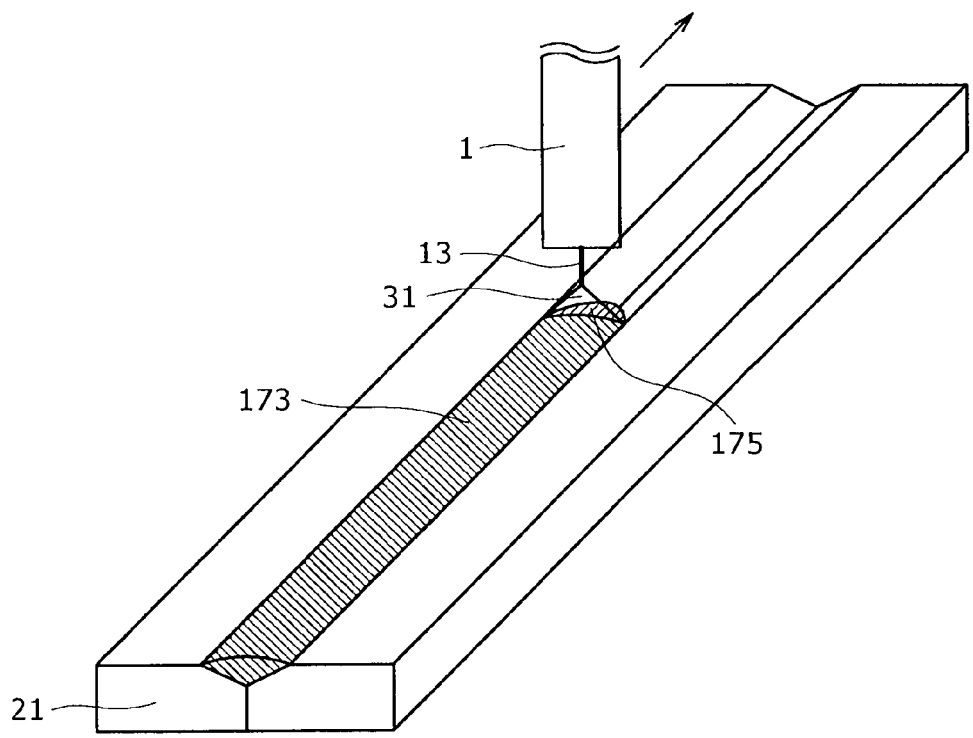
FIG. 1 is a schematic perspective view showing an execution state of Test 1.
Figure 2A:
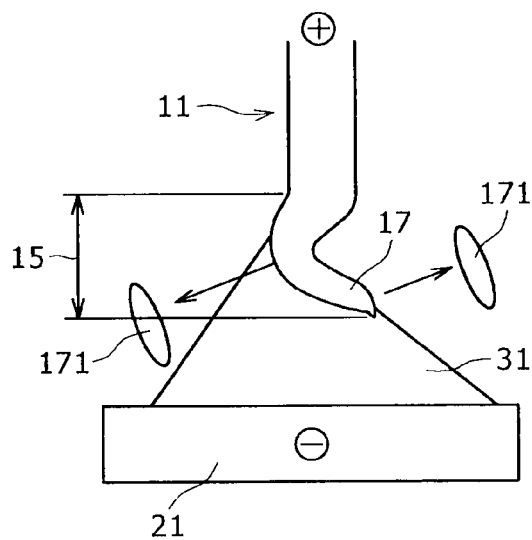
FIG. 2A is a schematic view showing a welding state using a conventional welding wire.
Figure 2B:
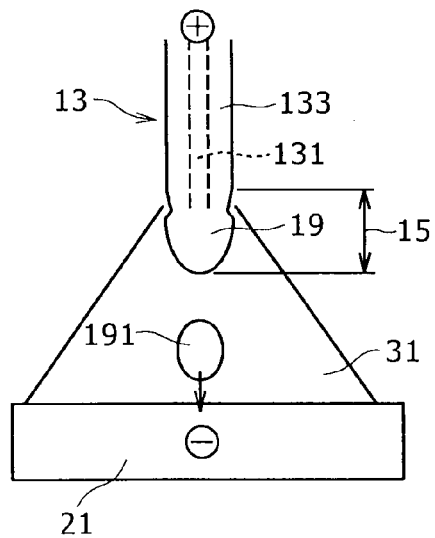
FIG. 2B is a schematic view showing a welding state using a welding wire of the present invention.

FIG. 1 is a perspective view showing a MIG welding method of the present embodiment which method uses pure Ar gas as shielding gas. A welding wire 13 is successively fed towards a welding torch 1, and is delivered from the end of the welding torch 1 towards the base metal 21 by being passed through a central portion of the welding torch 1. With the respective welding wire 13 and base metal 21 being used as the positive and negative electrodes, a welding voltage is applied from a power source (not shown), and an arc 31 is formed between the welding wire 13 and the base metal 21. The welding wire 13 and the base metal 21 are melted by the arc 31, and the molten pool 175 is formed. In this case, as shown in FIG. 2B, pure Ar gas is supplied as shielding gas to the neighborhood of a molten pool 175 on the base metal 21, thereby to shut down a periphery of the molten pool 175 and the arc 31 from the outside air.

When the welding wire 13 is moved along a welding line (in the case of FIG. 1, V-groove butt welding), the molten pool 175 solidifies, and a weld bead 173 is formed from the weld metal. Thereby, a weld joint can be obtained.

Next, the following describes the results of observation performed by using a high speed camera and the like for an unstable mechanism of the arc 31 in the pure Ar gas shielded MIG welding. FIGS. 2A and 2B, respectively, are schematic views showing the behavior of the droplet transfer. In the pure Ar gas atmosphere, neither endothermic reaction, which can occurs in the event of molecular dissociation when oxidizing gas is used, nor gas-specific potential gradient occurs. Hence, a distance 15 from the end of a molten droplet 19, which is formed with an ordinary solid wire 11 or flux-cored wire 13, to an arcing spot thereabove is very large, and a slender liquid column 17 as shown in FIG. 2A occurs. Further, a cathode spot on the surface of the base metal 21 is unstable since an oxide is less likely to be formed there, such that the arc generation spot actively moves around in a wide range. As a consequence, it is caused to be visible as a cleaning width formed in the neighborhood of the weld bead 173. Thus, while the arc 31 is very unstable, the liquid column 17 also is slender, such that the liquid column 17 is likely to have the influence of the abovedescribed. As such, along with the movement of the arc spot, the liquid column 17 is caused by energy of the movement to disperse around and to become an active spatter 171. Hence, as shown in FIG. 3A, the weld bead 173 is formed to have, for example, a meandering profile and is not normally formed, thereby making it impossible to execute welding.

For the phenomenon, the following three measures are taken to improve the stability of the arc 31:

(1) An element likely to electrically promote arc emission is exposed to an arcing portion, that is, the anode;

(2) Oxygen which has effects of reducing the energy potential and stabilizing the anode and cathode spots is supplied from the wire 13; and (3) The surface tension of the molten iron is increased to thereby form a spheric molten droplet 19, not the liquid column 17, to have a high deoxidation effect, thereby to make the molten droplet 19 to be less likely to be influenced by the direction of the arc 31.

As a result of study and research by us (the present inventors), we discovered that graphite is effective to implement (1) above. Graphite is one form of carbon and is inexpensive. As can be known from the fact that graphite is used as an arc gouging rod, it works as an intensive arcing source called "carbon arc". Graphite is stable even at high temperatures, it can be an arc generation spot even in gas shielded arc welding. In the mode of the solid wire 11, graphite cannot be fed to the arc 31, such that, as shown in FIG. 2B, the mode of the flux-cored wire 13 is essential.

As a method for feeding oxygen ((2) above) from the flux-cored wire 13, we discovered that it is effective to mix iron powder into a flux 131. More specifically, since iron is unstable in the air atmosphere, ordinarily it exists in the state of oxygen adsorption on the surface thereof or in the oxidized state. Iron powder has a larger surface area size than in the solid form in the unit mass, so that the amount of oxygen is very large, and consequently, a stable spot is formed as an arc generation spot as in the case of graphite.

We have found that, as a bead profile is shown in FIG. 3B, a stable arc 31 can be obtained in the pure Ar atmosphere only in the manners (1) and (2) above. We further found that, as the manner (3) above, the end of the wire 13 can be formed into the spherical molten droplet 19 by multiplicatively adding either Ti or Zr, thereby to make it possible to attain stabilization of the arc 31 and to inhibit the dispersion of the spatter 171.

When welding can become carried out using the pure Ar gas, since the amount of oxygen in the molten pool 175 to be formed contains as very small as 50 ppm or less, a deoxidization element is not necessarily required. As such, a deoxidization element sufficient only to improve the profile of the weld bead 173 can be appropriately added for purposes of regulating the wettability, for example. This is similar to mechanical properties, such as strength and toughness, for example. Limits of components of the flux-cored wire 13 will be described in detail herebelow.

(Graphite: 0.16 to 2.00 Mass % (on the Basis of the Total Wire Mass))

As described above, addition of graphite as a flux stabilizes the arcing source even in the pure Ar atmosphere. The component is effective in the event of 0.16 mass % or more. As a consequence, the component is effective for the spatter reduceability, and is excellent similarly as in the case of ordinarily $CO_2$ based welding also for the linearity of the welding speed. When the content is preferably 0.25 mass % or more, and more preferably 0.45 mass %, the arc stability, spatter reduceability, and linearity are improved. On the other hand, in the case where the graphite exceeds 2.00 mass %, the arc force becomes excessive, spatter frequently is generated, and hydrogen cracking also frequently occurs. Hence, the upper limit in the addition amount of graphite is specified to be 2.00 mass %.

(Iron Powder: 20 Mass % or More (on the Basis of the Total Flux Mass))

As described above, iron powder is very small, so that it retains a large amount of oxygen on the surface thereof. Hence, the iron powder becomes an arcing source when coexisting with graphite in the pure Ar environment. The component is effective in the case of 20 mass % on the basis of the total flux mass. No shortcoming is posed with excessive addition, so that no upper limit has to be set, but it is more preferable that the content is 40 mass % or more. The iron powder is defined to be a powder having a Fe concentration of 95 mass % or more and a granularity of 500 μm or less.

(Outer Sheath: Formed from a Carbon Steel Strip into a Pipe Shape or Formed from a Seamless Pipe)

The construction of the flux-cored wire of the present invention is the same as that of the conventional one. Generally, two methods are available for manufacturing the wire. One method is that, after a flux is sprayed along a longitudinal direction of a steel strip being used as an outer sheath, two ends of the steel strip are compressed in such a manner as to wrap the flux, and the wire is drawn to have a circular cross section. The other method is that a flux is filled into a large-diameter seamless pipe being used as an outer sheath, and then the wire is drawn. The present invention can employ any one of the manufacturing methods. Further, while seamed and seamless types are available, the present invention can use any one of the types. Further, while the composition of the outer sheath does not have to be specified in any way, a low carbon steel material is used in a general practice. Further, depending upon the case, copper plating is applied to the surface, but there are no limitations thereto in the present invention.

(Ti, Zr: Respectively, 0.03 to 5.00 Mass % (on the Basis of the Total Wire Mass))

Thus, using the graphite and the iron powder to form the flux is one approach for dramatically improving the arc stability. As an approach to further improve the stabilization effect, Ti and Zr are provided to coexist with the above-described components. Addition of an appropriate amount of the respective element acts to granulate the molten droplet at the wire end, thereby inhibit dangling thereof. A lower limit causing the effect to be exhibited is 0.03 mass %. When the addition amount exceeds 5.00 mass %, either Ti or Zr superfluously remains as an inclusion, thereby to cause adverse effects, such as cracking or an increase in the size of the molten droplet to the extent of destabilizing the arc. A source materials of Ti, Zr to be added may be any one of forms, such as ordinary ferrotitanium, ferrozirconium, titanium oxide, zirconium oxide, metal titanium, metal zirconium, sodium titanate, potassium titanate, zircon sand, and a compound thereof. Depending on the case, slag can be generated in the event shielding failure, it is more preferable that the content is 1.50 mass % or less to prevent the slag generation.

(C: 0.16 to 2.00 Mass % (on the Basis of the Total Wire Mass))

Graphite is used as the pure Ar arc stabilizer, so that, basically, the amount of C necessary to increase the strength of the weld metal can be sufficiently obtained from graphite. Hence, the specified amount of C is identical to that of graphite. However, the amount of C is specified since C can be added or mixedly entrained as a compound of not only graphite but also SiC or the like, such that C is independently specified. In the case of 0.45 mass % or more, a compression residual stress is imparted, thereby making it possible to increase the joint fatigue strength. In the case of 0.60 mass % or more, the joint fatigue strength can be further increased. However, in the case where C exceeds 2.00 mass %, spatter is frequently generated, the upper limit value is specified to be 2.00 mass %.

(Si: 2.00 Mass % or Less (on the Basis of the Total Wire Mass))

A deoxidizing agent is added to a general welding wire to inhibit oxidation of molten iron. However, in pure Ar-MIG welding, since oxidation does not occur, welding is executable without addition of a deoxidizing agent. Hence, no problem occurs even in the state free of Si. More preferably, Si is added in the amount of 0.50 mass % or more since the addition improves the profile of the toe of a bead. However, the amount exceeding 2.00 mass % causes the viscosity of the molten pool 175 to be excessive, humping becomes likely to occur in high speed welding. Hence, the upper limit is 2.00 mass %. Addition materials for Si are, for example, metal silicon, ferrosilicon, silicon manganese, silica sand, potassium feldspar, zircon sand, and silicate soda.

(Mn: 10.00 Mass % or Less (on the Basis of the Total Wire Mass))

Similarly as Si, Mn also is added as a general welding material for deoxidation. However, in pure Ar-MIG welding, since oxidation does not occur, welding is executable without addition of a deoxidizing agent. Hence, no problem occurs even in the state free of Mn. More preferably, Mn is added in the amount of 0.50 mass % or more since the addition improves the profile of the toe of the bead. Generally, taking the cost into account, it is sufficient to set 3.0 mass % to the upper limit. A further amount of Mn is effective to impart the function of improving the joint fatigue strength. However, the amount exceeding 10.00 mass % causes the viscosity of the molten pool 175 to be excessive, humping becomes likely to occur in high speed welding. Hence, the upper limit is specified to be 10.00 mass %. Addition materials for Mn are, for example, metal manganese, ferromanganese, and silicon manganese.

(P, S: Respectively, 0.030 Mass % or Less (on the Basis of the Total Wire Mass))

P and S are elements that act to reduce resistance of high-temperature cracking. However, there is no specific significance for positive addition of the elements (hence, no problems occur even without addition). Hence, the content of the respective element is controlled to 0.030 mass % or less, taking the industrial productivity and the cost similarly as in the case of the conventional wire.

(Al, Mg: Respectively, 1.00 Mass % or Less (on the Basis of the Total Wire Mass))

Al, Mg also is used as an intensive deoxidizing agent. However, in pure Ar-MIG welding, since oxidation does not occur, welding is executable without addition of a deoxidizing agent. Hence, no problem occurs even in the state free of Al, Mg. However, the addition amount exceeding 0.10 mass % is effective to increase the arc force that acts to increase the depth of penetration. On the other hand, the addition amount exceeding 1.00 mass % increases the spatter 171. Hence, the respective upper limit is specified to be 1.00 mass %. Addition materials for the elements are, for example, aluminium, ferroaluminium, metal magnesium, and aluminium magnesium.

(Ni, Cr, Nb, V, Mo, Cu: Respectively, 3.00 Mass % or Less (on the Basis of the Total Wire Mass))

While no problems occur even without addition of Ni, Cr, Nb, V, Mo, Cu, addition of the respective element in an appropriate amount provides effects of lowering the Ms point and securing an appropriate strength. At least 0.05 mass % is necessary to cause the effects to be exhibited. On the other hand, addition of the amount exceeding 3.00 mass % pauses shortcomings, such as an increase in the viscosity of the molten pool 175 to the extent of causing humping during high speed welding, and occurrence of cracking due to excessive strength. Hence, the amount is specified to be 3.00 mass % or less. Here, it is defined that, in the case where the wire surface is plated with copper, the amount of Cu in the mass % corresponds to a portion inclusive of the plated portion.

(B: 0.0200 Mass % or Less (on the Basis of the Total Wire Mass))

While no problems are posed without addition of B, a small addition amount of B causes lowering of the Ms point, and enables the toughness of the weld metal to be improved. To cause the effects to be exhibited, addition of B in the amount of 0.0010 mass % or more is necessary. On the other hand, however, the addition amount exceeds 0.0200 mass % causes cracking. Hence, the addition amount is controlled to be less than 0.0200 mass %.

(REM: 0.50 Mass % or Less (on the Basis of the Total Wire Mass))

"REM" stands for "rare earth metal", which generally is composed of, for example, La and Ce. While no problems are posed without addition of REM, addition of REM in the amount of 0.01 mass % or more improves the arc stability during MIG welding. Further, the addition further reduces the amount of oxygen of the weld metal, thereby making it possible to lower the Ms point. On the other hand, however, the addition amount exceeding 0.50 mass % causes the arc stabilizing effect to be saturated, thereby providing the inverse effect of growing the molten droplet and increasing the spatter. Further, the addition causes a cost increase.

(Total Content of K, Na, and Li: 1.00 Mass % or Less (on the Basis of the Total Wire Mass))

Similarly to the above, while no problems are posed without addition of K, Na, and Li, addition the respective elements in appropriate amounts eases electronic discharging, and smoothes the transfer of the molten droplet, thereby to reduce the generation amount of spatter. The effects are exhibited by addition of at least one of the elements in the total amount of 0.001 mass % or more. However, the addition amount exceeding 1.00 mass % causes the effects to be saturated, and reduces the arc force to thereby reduce the depth of penetration. Hence, problems are posed in that, for example, the molten pool becomes unstable to the extent of causing humping. Hence, the upper limit is specified to be 1.00 mass % in total. Generally, K, Na, and Li, respectively, are added to the flux by using feldspar, soda glass, and potash glass as materials containing $K_2O$, $Na_2O$, and $Li_2O$ as principal components.

(F, Ca: Respectively, 0.50 Mass % or Less (on the Basis of the Total Wire Mass))

Also in the case of F, Ca, while no problems occur even without addition of the respective element, addition thereof in an appropriate amount provides an intensive deoxidation action, and increases hardenability of the weld metal. At least 0.005 mass % is necessary to exhibit the effects. On the other hand, however, when the amount of F or Ca exceeds 0.50 mass %, the viscosity of the molten pool 175 to the extent of causing humping during high speed welding. Further, the excessive addition increases the generation amount of spatter, so that the addition amount of the respective F, Ca is controlled to be 0.50 mass % or less.

Although the flux percentage (fill percentage) in the present invention is not specifically different from that of the conventional flux-cored wire, the percentage is in the range of from 7 to 27 mass % on the basis of the total mass % of an ordinary wire. When the percentage is less than 7 mass %, necessary amounts of the flux elements, such as graphite and iron powder, necessary for MIG arc welding cannot be secured, thereby making it difficult to perform the forming process. On the other hand, when the percentage exceeds 27 mass %, the thickness of the outer sheath is reduced and hence the wire becomes likely to break, therefore causing the manufacture to be difficult.

The flux composition of the wire according to the present invention can further contain the following substances in addition to the graphite, iron powder, Ti source, and Zr source. More specifically, the substances are, for example, the Si source (described above), Mn source (described above), Al source (described above), Mg source (described above), metal powder or alloy powder of Ni, Cr, Nb, V, Mo, and Cu, metal powder of B, alloy powder, oxide, REM (La, Ce), the K sources (described above), Na source (described above), Li source (described above), F source, and Ca source. Further, in the case where a low carbon steel is used as the outer sheath, components contained in the outer sheath are more or less C, Mn, Si, P, and S, substances to be added to the flux have to be determined so that other elements than those described above and insufficient amounts of the elements, such as Mn and Si, which can be obtained only from the outer sheath, are compensated.

(Ar: JIS K 1105 Class 1 or 2)

The notation "pure Ar" in the present invention does not refer to scientific 100% Ar, but refers to pure Ar as an industrial product. JIS K 1105 specifies industrial Ar, in which Class 1 defines Ar having a purity of 99.999 vol. % or more, and Class 2 defines Ar having a purity of 99.995 vol. %. Either one can be used without problems as the welding wire 13 and the combination in the welding method. Ar gases with a purity lower than or equal to the above level cab be used, there occur reverse influences, such as an increase in the amount of fume or the amount of spatter, a reduction in the metal strength, or slug generation.

(Power Source: Pulsed Power Source)

For a welding apparatus, there are no problems even when a constant voltage characteristic power source, which generally is used for gas metal arc welding, is used. However, a combination with a pulsed power source is most recommended to improve the arc stability in MIG welding. Pure Ar welding is inferior to MAG welding using oxidizing gas in the regularity of molten droplet detachment that relates to the occurrence of humping. Hence, it is preferable to employ a pulsed welding method in which, regardless of an average current, a pinch force can be imparted with the operation of a constantly high current, and well-regulated molten droplet detachment can be implemented. While there are no specific limitations for pulse setting, generally there is used a condition in which the peak current is ranged from 350 to 600 A, the base current is ranged from 30 to 100 A, and the peak period (rise start-peak steady period-rise termination) is ranged from 0.8 to 5.0 milliseconds.

(Steel Sheet Having a Base Metal Strength of 490 MPa or More)

A most significant effect or advantage of MIG welding method in the pure Ar atmosphere is that valuable metal resources to be added to the welding wire are not used, greenhouse effect gas is not used, and slag is not caused in the weld portion. In order to obtain the advantage, the method can be applied as a general-purpose method with no limitations imposed on the base metal. Further, the effect of increasing the fatigue strength of the weld joint can be obtained by further limiting the amount of graphite, which is one of the components of the wire. A reason that residual stresses caused in the heat affected zone of the base metal due to transformation expansion of the weld metal can be reduced is that the stress occurring on the steel side in the event of expansion of the weld metal is changed to a compressive stress due to a reaction force to the weld metal. Hence, as a higher strength steel plate from which even higher reaction force can be expected is used, it can be expected that also the improvement of the fatigue property is greater. This is because when the steel material strength is low, also the reaction force is inevitably reduced, such that there is a risk that the force is returned by thermal contraction to the tensile stress state. When a tensile stress remains, the fatigue strength improvement cannot be expected. Hence, the base metal strength is specified to be 490 MPa as a lower limit with which the fatigue strength improvement can be expected. However, an upper limit value does not have to be specified. A maximum strength of steel sheets generally put into present practical uses is about 1500 MPa. In the case of a steel sheet having such a strength level, the fatigue strength can be improved with the use of the wire according to the present invention wire. Concurrently, overmatching of weld metal can be attained even in joint tensile strength.

EXAMPLES

As Test 1, butt welding as shown in FIG. 1 was carried out using a SS400 steel sheet having a sheet thickness of 12 mm. Table 1 shows a composition of a flux-cored wire steel hoop used in the test. Using the steel sheet as an outer sheath, flux-cored wires having compositions shown in Tables 2-1, 2-2, 3-1, 3-2, 4-1 and 4-2 were manufactured. However, only Comparative Example Nos. 65 and 66 are solid wires 11. The respective elements are, basically, indicated as the positive addition elements, and "−" in the respective cell is indicated as a non-addition element. Further, the cells regarding P and S all indicate values as impurities, and the values shown therein are customary analysis values. The content of the respective element indicates the percentage on the basis of the total wire mass, but only the content of the respective item of iron powder indicates the percentage on the basis of total flux mass. Execution conditions applied to Test 1 were—shielding gas: JIS K 1105 Class 1 Ar gas; wire diameter: mm; wire extension length: 15 mm; welding current: 280 A; and welding speed: 40 cm/min. The polarities were the reverse polarities (wire: positive; and base metal: negative), and both a DC constant voltage characteristic power source and pulsed power source are used for generating the different welding current wave forms.

TABLE 1

Chemical composition of steel hoop applied for the flux cored wires (mass %)

| C | Si | Mn | P | S | Fe |
|---|---|---|---|---|---|
| 0.01 | 0.01 | 0.22 | 0.010 | 0.005 | Remainder |

TABLE 2-1

| | No. | Wire Type | Flux percentage (Mass % on the basis of the total wire mass) | Wire Composition (Mass %) (Iron powder: Percentage on the basis of the total flux mass; Elements other than iron powder: Percentage on the basis of the total wire mass) | | | | | | | | |
|---|---|---|---|---|---|---|---|---|---|---|---|---|
| | | | | Graphite | Iron powder | Ti | Zr | C | Si | Mn | P | S | Al |
| Example | 1 | FCW | 16 | 0.18 | 90 | — | — | 0.19 | 0.01 | 0.22 | 0.011 | 0.006 | — |
| | 2 | FCW | 15 | 0.45 | 85 | — | — | 0.46 | 0.01 | 0.22 | 0.012 | 0.006 | — |
| | 3 | FCW | 10 | 0.18 | 80 | 0.15 | — | 0.19 | 0.01 | 0.22 | 0.011 | 0.007 | — |
| | 4 | FCW | 18 | 0.18 | 70 | 0.15 | — | 0.19 | 0.80 | 1.50 | 0.010 | 0.006 | — |
| | 5 | FCW | 20 | 0.25 | 62 | 0.10 | — | 0.27 | 0.50 | 1.20 | 0.010 | 0.006 | — |
| | 6 | FCW | 16 | 0.44 | 55 | 0.01 | 0.03 | 0.45 | 1.00 | 2.00 | 0.019 | 0.007 | 0.10 |
| | 7 | FCW | 17 | 0.48 | 42 | 0.05 | — | 0.49 | 0.01 | 1.00 | 0.012 | 0.010 | 0.006 |
| | 8 | FCW | 19 | 0.80 | 50 | 0.10 | — | 0.81 | 0.80 | 1.50 | 0.012 | 0.005 | — |
| | 9 | FCW | 7 | 0.16 | 73 | 0.20 | 0.05 | 0.17 | 0.01 | 0.22 | 0.011 | 0.010 | — |
| | 10 | FCW | 14 | 0.81 | 45 | 0.12 | — | 0.82 | 1.00 | 2.20 | 0.012 | 0.007 | — |
| | 11 | FCW | 16 | 1.99 | 30 | 0.06 | — | 2.00 | 0.25 | 0.50 | 0.010 | 0.006 | — |
| | 12 | FCW | 16 | 0.50 | 40 | 0.10 | — | 0.51 | 1.25 | 1.75 | 0.010 | 0.006 | 0.50 |

TABLE 2-1-continued

| | | Flux percentage (Mass % on the basis of the | Wire Composition (Mass %) (Iron powder: Percentage on the basis of the total flux mass; Elements other than iron powder: Percentage on the basis of the total wire mass) | | | | | | | | | |
|---|---|---|---|---|---|---|---|---|---|---|---|---|
| No. | Wire Type | total wire mass) | Graphite | Iron powder | Ti | Zr | C | Si | Mn | P | S | Al |
| 13 | FCW | 16 | 0.75 | 35 | 0.18 | — | 0.80 | 1.05 | 10.00 | 0.011 | 0.007 | 0.005 |
| 14 | FCW | 19 | 1.00 | 63 | 1.50 | — | 1.01 | 2.00 | 5.00 | 0.010 | 0.008 | — |
| 15 | FCW | 12 | 0.60 | 20 | — | 0.15 | 0.61 | 0.01 | 0.22 | 0.020 | 0.020 | — |
| 16 | FCW | 13 | 0.20 | 55 | — | — | 0.23 | 0.90 | 1.80 | 0.012 | 0.008 | 0.95 |
| 17 | FCW | 26 | 1.50 | 74 | — | 1.40 | 1.51 | 1.50 | 0.30 | 0.014 | 0.007 | — |
| 18 | FCW | 20 | 0.30 | 29 | 1.00 | — | 0.31 | 0.05 | 3.05 | 0.018 | 0.030 | 0.050 |
| 19 | FCW | 18 | 0.65 | 80 | 0.03 | 0.80 | 0.68 | 0.65 | 1.00 | 0.030 | 0.015 | 0.002 |
| 20 | FCW | 17 | 0.85 | 75 | 0.12 | — | 0.86 | 1.15 | 1.85 | 0.014 | 0.005 | — |
| 21 | FCW | 19 | 0.25 | 82 | 0.02 | — | 0.26 | 0.70 | 1.50 | 0.010 | 0.006 | 0.020 |
| 22 | FCW | 16 | 0.80 | 75 | 0.11 | — | 0.82 | 1.10 | 15.20 | 0.012 | 0.006 | 0.050 |
| 23 | FCW | 14 | 0.78 | 87 | — | — | 0.79 | 0.10 | 0.50 | 0.011 | 0.007 | — |
| 24 | FCW | 16 | 0.68 | 70 | — | 0.12 | 0.69 | 1.00 | 1.40 | 0.012 | 0.006 | — |
| 25 | FCW | 17 | 0.95 | 50 | 0.20 | — | 0.96 | 0.85 | 1.25 | 0.019 | 0.010 | — |
| 26 | FCW | 19 | 0.20 | 41 | 0.06 | — | 0.22 | 2.50 | 1.50 | 0.012 | 0.007 | 0.010 |
| 27 | FCW | 10 | 1.10 | 66 | 0.03 | — | 1.11 | 0.25 | 1.00 | 0.010 | 0.007 | 0.10 |

TABLE 2-2

| | | Wire Composition (Mass %) (Percentage on the basis of the total wire, inclusive of the outer sheath) | | | | | | | | | | | |
|---|---|---|---|---|---|---|---|---|---|---|---|---|---|
| | No. | Mg | Ni | Cr | Nb | V | Mo | Cu | B | REM | Total of K, Na, and Li | F | Ca |
| Example | 1 | — | — | — | — | — | — | — | — | — | — | — | — |
| | 2 | — | — | — | — | — | — | — | — | — | — | — | — |
| | 3 | — | — | — | — | — | — | — | — | — | — | — | — |
| | 4 | — | — | — | — | — | — | — | — | — | 0.008 | — | — |
| | 5 | — | — | — | — | — | — | — | — | — | — | — | — |
| | 6 | — | — | — | — | — | — | — | — | — | 0.35 | — | — |
| | 7 | 0.15 | — | — | — | — | — | — | — | — | 0.050 | — | — |
| | 8 | — | — | — | — | — | — | — | — | — | — | — | — |
| | 9 | — | — | — | — | — | — | — | — | — | — | — | — |
| | 10 | — | — | — | — | — | — | — | — | — | — | — | — |
| | 11 | — | — | — | — | — | — | — | — | — | — | — | — |
| | 12 | 0.050 | 0.50 | 0.50 | — | — | — | 0.10 | — | — | 0.10 | — | — |
| | 13 | 0.005 | — | — | — | — | — | — | — | — | 0.003 | — | — |
| | 14 | 0.50 | 1.50 | 0.10 | 0.05 | 0.05 | 0.50 | — | 0.0015 | — | — | — | — |
| | 15 | — | — | 2.90 | — | — | 2.90 | — | — | 0.45 | 0.70 | 0.05 | — |
| | 16 | 0.95 | — | — | 2.85 | 1.50 | 0.10 | 0.25 | — | — | — | 0.50 | 0.43 |
| | 17 | — | 0.05 | 1.25 | — | — | 0.50 | — | 0.0190 | — | — | 0.25 | 0.05 |
| | 18 | 0.080 | — | 0.05 | — | 0.02 | 0.02 | 2.75 | 0.0065 | — | 0.024 | — | — |
| | 19 | — | 0.20 | 0.02 | 1.23 | 2.90 | 1.25 | 1.01 | 0.0110 | — | — | — | 0.20 |
| | 20 | — | 2.98 | — | — | — | — | — | 0.0030 | 0.10 | 0.98 | — | — |
| | 21 | — | 10.00 | 10.00 | — | — | — | — | — | — | — | — | — |
| | 22 | 0.010 | 5.00 | 2.20 | — | — | — | — | — | — | — | — | — |
| | 23 | — | — | — | — | — | — | — | — | — | 0.40 | — | 0.10 |
| | 24 | — | — | — | — | — | — | — | — | — | — | — | — |
| | 25 | — | — | — | — | — | — | — | — | — | — | — | — |
| | 26 | 0.010 | — | — | — | — | — | — | — | — | — | — | — |
| | 27 | 0.10 | — | — | — | — | — | — | — | — | — | — | — |

Note)
The remainder of the wire composition: Fe other than iron powder and inevitable impurity

TABLE 3-1

| | | | Flux percentage (Mass % on the basis of the | Wire Composition (Mass %) (Iron powder: Percentage on the basis of the total flux mass; Elements other than iron powder: Percentage on the basis of the total wire mass) | | | | | | | | | |
|---|---|---|---|---|---|---|---|---|---|---|---|---|---|
| | No. | Wire Type | total wire mass) | Graphite | Iron powder | Ti | Zr | C | Si | Mn | P | S | Al |
| Example | 28 | FCW | 9 | 0.80 | 42 | 0.10 | — | 0.81 | 0.80 | 1.50 | 0.012 | 0.006 | — |
| | 29 | FCW | 16 | 0.80 | 90 | 0.10 | — | 0.81 | 0.80 | 1.50 | 0.012 | 0.006 | — |
| | 30 | FCW | 15 | 0.45 | 86 | 0.05 | — | 0.46 | 0.40 | 2.15 | 0.011 | 0.007 | 0.005 |
| | 31 | FCW | 18 | 0.85 | 60 | 3.00 | — | 0.86 | 0.61 | 1.50 | 0.012 | 0.005 | — |

TABLE 3-1-continued

| | | Flux percentage (Mass % on the basis of the total wire mass) | Wire Composition (Mass %) (Iron powder: Percentage on the basis of the total flux mass; Elements other than iron powder: Percentage on the basis of the total wire mass) | | | | | | | | |
|---|---|---|---|---|---|---|---|---|---|---|---|
| No. | Wire Type | | Graphite | Iron powder | Ti | Zr | C | Si | Mn | P | S | Al |
| 32 | FCW | 19 | 0.90 | 58 | 5.00 | — | 0.91 | 0.86 | 1.75 | 0.015 | 0.007 | 0.09 |
| 33 | FCW | 15 | 0.75 | 75 | — | 4.90 | 0.76 | 0.85 | 1.74 | 0.011 | 0.006 | — |
| 34 | FCW | 16 | 0.80 | 72 | — | — | 0.82 | 0.90 | 1.60 | 0.013 | 0.006 | — |
| 35 | FCW | 13 | 0.50 | 80 | — | — | 0.52 | 0.65 | 1.35 | 0.010 | 0.007 | — |
| 36 | FCW | 17 | 0.75 | 75 | 6.00 | — | 0.76 | 0.77 | 1.90 | 0.015 | 0.007 | — |
| 37 | FCW | 12 | 0.32 | 81 | — | 5.50 | 0.33 | 1.05 | 2.30 | 0.013 | 0.006 | — |
| 38 | FCW | 17 | 0.55 | 74 | 0.13 | — | 0.58 | 0.52 | 10.50 | 0.010 | 0.006 | — |
| 39 | FCW | 18 | 0.70 | 70 | — | — | 0.72 | 0.84 | 1.71 | 0.033 | 0.006 | — |
| 40 | FCW | 17 | 0.65 | 77 | 0.15 | — | 0.66 | 0.64 | 2.50 | 0.016 | 0.032 | — |
| 41 | FCW | 17 | 0.85 | 70 | — | 0.20 | 0.86 | 0.72 | 1.66 | 0.015 | 0.005 | 1.10 |
| 42 | FCW | 18 | 0.95 | 65 | 0.15 | 0.15 | 0.96 | 0.99 | 1.89 | 0.016 | 0.007 | — |
| 43 | FCW | 17 | 0.80 | 72 | 0.10 | — | 0.81 | 0.84 | 1.80 | 0.015 | 0.007 | — |
| 44 | FCW | 17 | 0.82 | 72 | 0.10 | — | 0.83 | 0.80 | 1.85 | 0.014 | 0.006 | — |
| 45 | FCW | 17 | 0.78 | 76 | — | — | 0.79 | 0.84 | 1.80 | 0.015 | 0.009 | — |
| 46 | FCW | 16 | 0.81 | 75 | 0.05 | — | 0.82 | 0.77 | 1.77 | 0.011 | 0.006 | — |
| 47 | FCW | 16 | 0.68 | 73 | 0.20 | — | 0.69 | 0.85 | 1.91 | 0.015 | 0.009 | — |
| 48 | FCW | 18 | 0.84 | 70 | — | — | 0.85 | 0.81 | 1.83 | 0.020 | 0.007 | — |
| 49 | FCW | 17 | 0.80 | 72 | — | 0.10 | 0.81 | 0.83 | 2.20 | 0.022 | 0.006 | — |
| 50 | FCW | 17 | 0.79 | 75 | — | — | 0.80 | 0.71 | 1.56 | 0.010 | 0.005 | — |
| 51 | FCW | 17 | 0.70 | 72 | 0.18 | — | 0.77 | 0.96 | 1.66 | 0.013 | 0.006 | 0.40 |
| 52 | FCW | 16 | 0.84 | 76 | 0.10 | — | 0.85 | 0.84 | 1.80 | 0.015 | 0.008 | — |
| 53 | FCW | 18 | 0.76 | 72 | 0.17 | — | 0.77 | 1.00 | 1.55 | 0.011 | 0.007 | — |

TABLE 3-2

| | No. | Wire Composition (Mass %) (Percentage on the basis of the total wire, inclusive of the outer sheath) | | | | | | | | | | | |
|---|---|---|---|---|---|---|---|---|---|---|---|---|---|
| | | Mg | Ni | Cr | Nb | V | Mo | Cu | B | REM | Total of K, Na, and Li | F | Ca |
| Example | 28 | — | — | — | — | — | — | — | — | — | — | — | — |
| | 29 | — | — | — | — | — | — | — | — | — | — | — | — |
| | 30 | — | — | — | — | — | — | — | — | — | — | — | — |
| | 31 | — | — | — | — | — | — | — | — | — | — | — | — |
| | 32 | — | — | — | — | — | — | — | — | — | — | — | — |
| | 33 | — | — | — | — | — | — | — | — | — | 0.010 | — | — |
| | 34 | — | — | — | — | — | — | — | — | — | — | — | — |
| | 35 | — | — | — | — | — | — | — | — | — | — | — | — |
| | 36 | — | — | — | — | — | — | — | — | — | 0.05 | — | — |
| | 37 | — | — | — | — | — | — | — | — | — | — | — | — |
| | 38 | — | — | — | — | — | — | — | — | — | — | — | — |
| | 39 | — | — | — | — | — | — | 0.16 | — | — | — | — | — |
| | 40 | — | — | — | — | — | — | — | — | — | — | — | — |
| | 41 | — | — | — | — | — | — | — | — | — | — | — | — |
| | 42 | 1.10 | — | — | — | — | — | — | — | — | — | — | — |
| | 43 | — | 3.20 | — | — | — | — | — | — | — | — | — | — |
| | 44 | — | — | 3.20 | — | — | — | — | — | — | — | — | — |
| | 45 | — | — | — | 3.20 | — | — | — | — | — | — | — | — |
| | 46 | — | — | — | — | 3.20 | — | — | — | — | — | — | — |
| | 47 | — | — | — | — | — | 3.20 | — | — | — | — | — | — |
| | 48 | — | — | — | — | — | — | 3.20 | — | — | — | — | — |
| | 49 | — | — | — | — | — | — | — | 0.0210 | — | — | — | — |
| | 50 | — | — | — | — | — | — | — | — | 0.60 | — | — | — |
| | 51 | — | — | — | — | — | — | — | — | — | 1.10 | — | — |
| | 52 | — | — | — | — | — | — | — | — | — | — | 0.51 | — |
| | 53 | — | — | — | — | — | — | — | — | — | — | — | 0.51 |

Note)
The remainder of the wire composition: Fe other than iron powder and inevitable impurity

TABLE 4-1

| | | | Flux percentage (Mass % on the basis of the total wire mass) | Wire Composition (Mass %) (Iron powder: Percentage on the basis of the total flux mass; Elements other than iron powder: Percentage on the basis of the total wire mass) | | | | | | | | |
|---|---|---|---|---|---|---|---|---|---|---|---|---|
| | No. | Wire Type | | Graphite | Iron powder | Ti | Zr | C | Si | Mn | P | S | Al |
| Comparative example | 54 | FCW | 15 | 0.06 | 93 | — | — | 0.07 | 0.50 | 1.50 | 0.010 | 0.006 | — |
| | 55 | FCW | 14 | 0.15 | 80 | — | — | 0.16 | 0.01 | 0.22 | 0.017 | 0.010 | — |

TABLE 4-1-continued

| | | Flux percentage (Mass % on the basis of the | Wire Composition (Mass %) (Iron powder: Percentage on the basis of the total flux mass; Elements other than iron powder: Percentage on the basis of the total wire mass) | | | | | | | | | |
|---|---|---|---|---|---|---|---|---|---|---|---|---|
| No. | Wire Type | total wire mass) | Graphite | Iron powder | Ti | Zr | C | Si | Mn | P | S | Al |
| 56 | FCW | 13 | 0.14 | 85 | 0.20 | — | 0.15 | 0.10 | 0.55 | 0.014 | 0.006 | — |
| 57 | FCW | 17 | 0.13 | 77 | 0.10 | — | 0.15 | 1.00 | 2.21 | 0.012 | 0.006 | — |
| 58 | FCW | 16 | 0.10 | 60 | — | 0.10 | 0.11 | 0.60 | 1.40 | 0.011 | 0.007 | 0.10 |
| 59 | FCW | 18 | 2.05 | 35 | 0.05 | — | 2.06 | 0.75 | 1.75 | 0.010 | 0.006 | — |
| 60 | FCW | 15 | 1.00 | 19 | — | — | 1.01 | 0.05 | 0.35 | 0.013 | 0.006 | — |
| 61 | FCW | 16 | 0.50 | 10 | — | — | 0.50 | 0.60 | 1.56 | 0.012 | 0.009 | — |
| 62 | FCW | 14 | 0.80 | 0 | 0.15 | — | 0.81 | 0.87 | 1.97 | 0.014 | 0.007 | — |
| 63 | FCW | 16 | 0.08 | 5 | 0.85 | — | 0.10 | 0.80 | 1.60 | 0.010 | 0.006 | — |
| 64 | FCW | 16 | 2.50 | 15 | — | — | 2.51 | 0.55 | 1.40 | 0.011 | 0.007 | — |
| 65 | Solid | — | — | — | 0.15 | — | 0.70 | 0.80 | 1.80 | 0.012 | 0.005 | — |
| 66 | Solid | — | — | — | — | — | 0.08 | 0.70 | 1.50 | 0.012 | 0.012 | — |

TABLE 4-2

| | | Wire Composition (Mass %) (Percentage on the basis of the total wire, inclusive of the outer sheath) | | | | | | | | | | | |
|---|---|---|---|---|---|---|---|---|---|---|---|---|---|
| | No. | Mg | Ni | Cr | Nb | V | Mo | Cu | B | REM | Total of K, Na, and Li | F | Ca |
| Comparative example | 54 | — | — | — | — | — | — | — | — | — | — | — | — |
| | 55 | 0.20 | — | — | — | — | — | — | — | — | — | — | — |
| | 56 | — | — | — | — | — | — | — | — | — | — | — | — |
| | 57 | — | — | — | — | — | — | — | — | — | — | — | — |
| | 58 | 0.10 | — | — | — | — | — | — | — | — | 0.050 | — | — |
| | 59 | — | — | — | — | — | — | — | — | — | — | — | — |
| | 60 | — | — | — | — | — | — | — | — | — | — | — | — |
| | 61 | — | — | — | — | — | — | — | — | — | — | — | — |
| | 62 | — | — | — | — | — | — | — | — | — | — | — | — |
| | 63 | — | — | — | — | — | — | — | — | — | — | — | — |
| | 64 | — | 5.0 | 5.0 | — | — | — | — | — | — | — | — | — |
| | 65 | — | — | — | — | — | — | 0.20 | — | — | — | — | — |
| | 66 | — | — | — | — | — | — | — | — | — | — | — | — |

Note)
The remainder of the wire composition: Fe other than iron powder and inevitable impurity Evaluations were performed with the results shown in Tables 6-1, 6-2, and 7. The current and voltage were continuously measured, and the results were as shown in the tables with the following symbols:

⊚: No arc unstable event occurred per one minute;

O: One or more and four or less arc unstable events occurred per minute;

Δ: Five or more and eight or less arc unstable events occurred per minute (tolerable lower limit); and x: Nine or more arc unstable events occurred per minute (welding is impossible).

Further, in the case of the pulsed power source, the amount of spatter was measured, and the results were as shown in the tables with the following symbols:

⊚: 0.5 g/minute or less (good);

O: Over 0.50 g/minute and 1.00 g/minute or less; and x: Over 1.00 g/minute (a large amount of spatter).

Further, sensory evaluations were performed for the weld bead profiles, and the results were as shown in the tables with the following symbols:

⊚: Edges of the weld bead were uniform and excellent in linearity;

O: Unstable portions, such as humping-like portions, were rarely observed, but were at non-problematic levels in practical uses; and x: The weld bead was determined to meander (unacceptable).

Further, verification was performed for weld bead cracking, and the results were as shown in the tables with the following symbols:

O: No crack was observed;

Δ: One cracked portion was observed per meter of the weld length; and x: Two or more cracked portions were observed per meter of the weld length (unacceptable).

In Tables 6-1, 6-2, and 7, the result in the case where the DC constant voltage characteristic power source was used is indicated as "without P", and the case where the pulsed power source was used is indicated as "with P".

Figure 4:
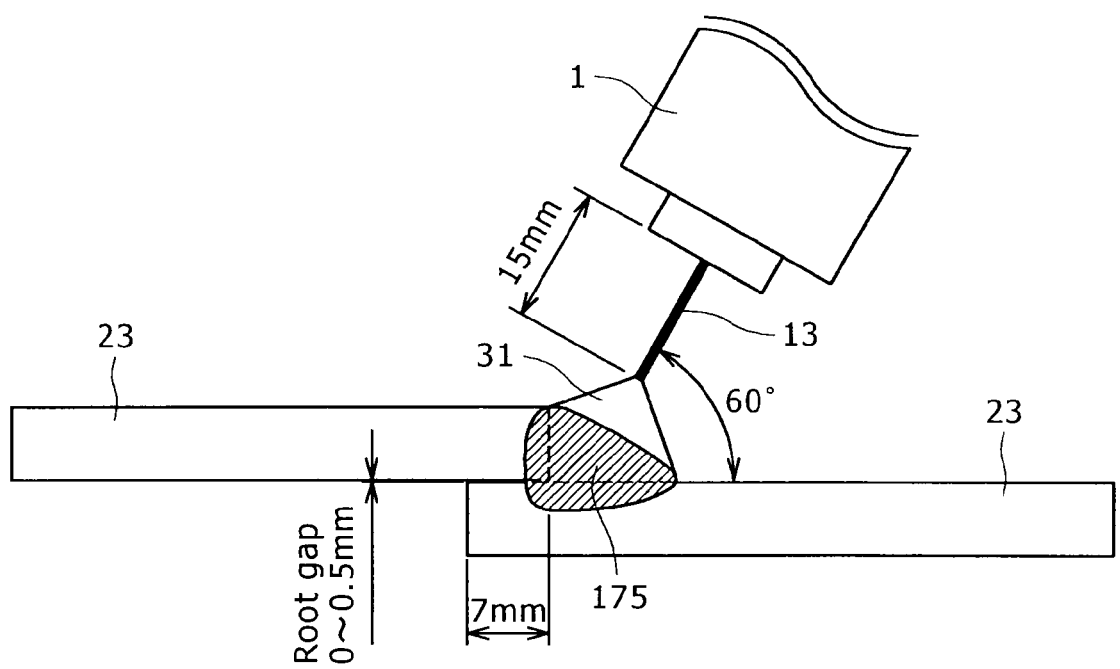
FIG. 4 is a schematic side view showing an execution state of Test 2.
Figure 5A:
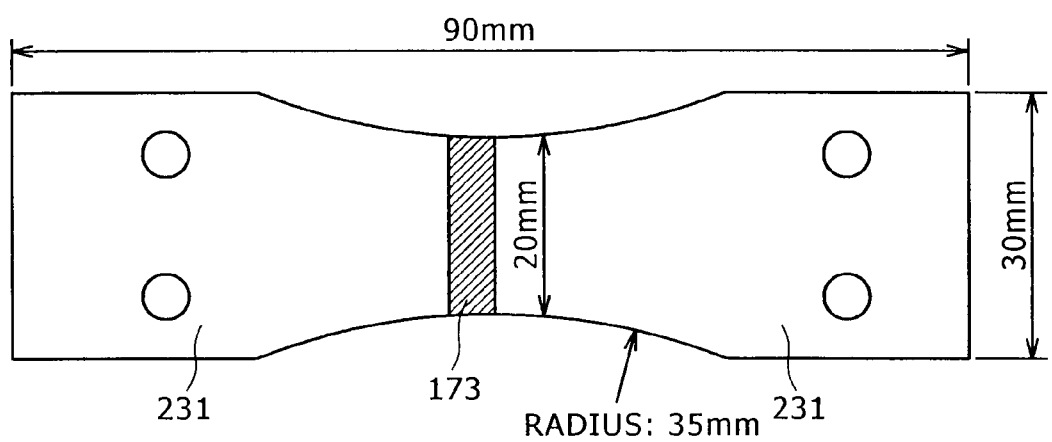
FIG. 5A is a top view showing a weld base metal or test specimen used in Test 2.
Figure 5B:
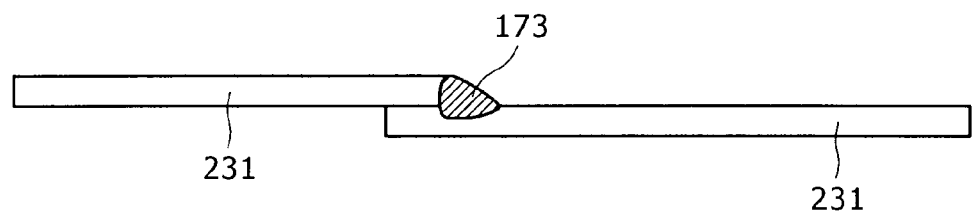
FIG. 5B is a side view of the test specimen used shown in FIG. 5A.

As Test 2, lap fillet welding of the steel sheets having the composition shown in Table 5 was executed in a manner shown in FIG. 4 by using the welding wires evaluated in Test 1 with the results shown by "⊚" and "O" under the conditions where the pulsed power source was used, and fatigue tests were performed, and the results were as shown in Tables 6-1, 6-2, and 7. Welding execution conditions applied in Test 2 were—shielding gas: JIS K 1105 Class 2 Ar gas; shielding gas flowrate: 15 litters/minute; wire diameter: 1.2 mm; wire extension length: 15 mm; welding current: 270 A; welding speed: 120 cm/minute; and forward/backward angle of the torch: 0° (right angle with respect to the weld line). As the fatigue test, a fatigue test piece 231 shown in FIG. 5 was taken from a respective welding work, and a double side bending fatigue test of the test piece was performed. The fatigue strength at $10^7$ cycles (frequency of 25 Hz, sinusoidal wave stress) was defined as the fatigue strength, and comparison was performed. In the tables, the results are shown by the following symbols:

x: less than 200 MPa (fatigue strength improvement effect: absent); and

O: 200 MPa or more (fatigue strength improvement effect: present).

TABLE 5

Composition of base metal for joint fatigue examinations (percentage on the basis of the total base metal mass), sheet thickness, and tensile strength

| C | Si | Mn | P | S | Fe | Sheet thickness | Tensile strength |
|---|---|---|---|---|---|---|---|
| 0.06 | 0.98 | 1.45 | 0.005 | 0.002 | Remainder | 3.2 mm | 795 MPa |

TABLE 6-1

| | | Test 1 | | | | | Test 2 |
|---|---|---|---|---|---|---|---|
| | | Instability Times (times/sec.), Evaluation | | Amount of spatter | Bead profile | Crack resistance | Fatigue strength |
| | No. | Without P | With P | (g/min.), Evaluation | evaluation | property | (MPa), Evaluation |
| Example | 1 | 7Δ | 2○ | 0.89○ | ○ | ○ | 135X |
| | 2 | 5Δ | 1○ | 0.63○ | ○ | ○ | 210○ |
| | 3 | 4○ | 0⊚ | 0.46⊚ | ⊚ | ○ | 139X |
| | 4 | 3○ | 0⊚ | 0.42⊚ | ⊚ | ○ | 141X |
| | 5 | 2○ | 0⊚ | 0.36⊚ | ⊚ | ○ | 146X |
| | 6 | 2○ | 0⊚ | 0.29⊚ | ⊚ | ○ | 201○ |
| | 7 | 2○ | 0⊚ | 0.25⊚ | ⊚ | ○ | 203○ |
| | 8 | 1○ | 0⊚ | 0.12⊚ | ⊚ | ○ | 305○ |
| | 9 | 4○ | 0⊚ | 0.48⊚ | ⊚ | ○ | 136X |
| | 10 | 2○ | 0⊚ | 0.15⊚ | ⊚ | ○ | 310○ |
| | 11 | 2○ | 0⊚ | 0.47⊚ | ⊚ | ○ | 367○ |
| | 12 | 2○ | 0⊚ | 0.20⊚ | ⊚ | ○ | 236○ |
| | 13 | 7Δ | 2○ | 0.86○ | ○ | ○ | 330○ |
| | 14 | 5Δ | 1○ | 0.69○ | ○ | ○ | 354○ |
| | 15 | 3○ | 0⊚ | 0.15⊚ | ⊚ | ○ | 281○ |
| | 16 | 6Δ | 0⊚ | 0.80○ | ○ | ○ | 150X |
| | 17 | 2○ | 0⊚ | 0.18⊚ | ⊚ | ○ | 368○ |
| | 18 | 4○ | 0⊚ | 0.39⊚ | ⊚ | ○ | 155X |
| | 19 | 3○ | 0⊚ | 0.16⊚ | ⊚ | ○ | 240○ |
| | 20 | 1○ | 0⊚ | 0.17⊚ | ⊚ | ○ | 315○ |
| | 21 | 7Δ | 2○ | 0.39⊚ | Δ | Δ | 199X |
| | 22 | 1○ | 0⊚ | 0.15⊚ | Δ | Δ | 322○ |
| | 23 | 6Δ | 3○ | 0.70○ | ○ | ○ | 310○ |
| | 24 | 2○ | 0⊚ | 0.19⊚ | ⊚ | ○ | 308○ |
| | 25 | 2○ | 0⊚ | 0.13⊚ | ⊚ | ○ | 330○ |
| | 26 | 4○ | 0⊚ | 0.35⊚ | Δ | ○ | 170X |
| | 27 | 3○ | 0⊚ | 0.17⊚ | ⊚ | ○ | 335○ |

TABLE 6-2

| | | Test 1 | | | | | Test 2 |
|---|---|---|---|---|---|---|---|
| | | Instability Times (times/sec.), Evaluation | | Amount of spatter | Bead profile | Crack resistance | Fatigue strength |
| | No. | Without P | With P | (g/min.), Evaluation | evaluation | property | (MPa), Evaluation |
| Example | 28 | 2○ | 0⊚ | 0.19⊚ | ⊚ | ○ | 320○ |
| | 29 | 2○ | 0⊚ | 0.13⊚ | ⊚ | ○ | 320○ |
| | 30 | 2○ | 0⊚ | 0.15⊚ | ⊚ | ○ | 246○ |
| | 31 | 2○ | 0⊚ | 0.43⊚ | ⊚ | ○ | 300○ |
| | 32 | 2○ | 0⊚ | 0.47⊚ | ⊚ | ○ | 311○ |
| | 33 | 2○ | 0⊚ | 0.45⊚ | ⊚ | ○ | 285○ |
| | 34 | 6Δ | 1○ | 0.82○ | ○ | ○ | 220○ |
| | 35 | 7Δ | 2○ | 0.86○ | ○ | ○ | 208○ |
| | 36 | 8Δ | 3○ | 0.80○ | ○ | Δ | 240○ |
| | 37 | 8Δ | 4○ | 0.90○ | ○ | Δ | 173X |
| | 38 | 2○ | 0⊚ | 0.35⊚ | Δ | ○ | 299○ |
| | 39 | 7Δ | 3○ | 0.90○ | ⊚ | Δ | 278○ |
| | 40 | 2○ | 0⊚ | 0.35⊚ | ⊚ | Δ | 285○ |
| | 41 | 8Δ | 3○ | 0.94○ | ⊚ | ○ | 292○ |
| | 42 | 7Δ | 4○ | 0.91○ | ⊚ | ○ | 305○ |
| | 43 | 4○ | 0⊚ | 0.33⊚ | Δ | Δ | 270○ |

TABLE 6-2-continued

| | Test 1 | | | | | Test 2 |
|---|---|---|---|---|---|---|
| | Instability Times (times/sec.), Evaluation | | Amount of spatter | Bead profile | Crack resistance | Fatigue strength |
| No. | Without P | With P | (g/min.), Evaluation | evaluation | property | (MPa), Evaluation |
| 44 | 4○ | 0◎ | 0.43◎ | △ | △ | 313○ |
| 45 | 7△ | 2○ | 0.88○ | △ | △ | 271○ |
| 46 | 3○ | 0◎ | 0.30◎ | △ | △ | 265○ |
| 47 | 3○ | 0◎ | 0.38◎ | △ | △ | 288○ |
| 48 | 8△ | 4○ | 0.92○ | △ | △ | 271○ |
| 49 | 3○ | 0◎ | 0.41◎ | ◎ | △ | 305○ |
| 50 | 7△ | 4○ | 0.89○ | ◎ | ○ | 252○ |
| 51 | 3○ | 0◎ | 0.30◎ | △ | ○ | 265○ |
| 52 | 8△ | 3○ | 0.92○ | △ | ○ | 253○ |
| 53 | 8△ | 4○ | 0.79○ | △ | ○ | 260○ |

TABLE 7

| | | Test 1 | | | | | Test 2 |
|---|---|---|---|---|---|---|---|
| | | Instability Times (times/sec.), Evaluation | | Amount of spatter | Bead profile | Crack resistance | Fatigue strength |
| | No. | Without P | With P | (g/min.), Evaluation | evaluation | property | (MPa), Evaluation |
| Comparative Example | 54 | 15X | 10X | 2.55X | X | ○ | — |
| | 55 | 12X | 10X | 1.10X | X | ○ | — |
| | 56 | 10X | 9X | 1.20X | X | ○ | — |
| | 57 | 10X | 8X | 1.08X | X | ○ | — |
| | 58 | 11X | 9X | 1.47X | X | ○ | — |
| | 59 | 15X | 8X | 1.04X | ○ | X | — |
| | 60 | 14X | 10X | 1.10X | X | ○ | — |
| | 61 | 14X | 9X | 1.05X | X | ○ | — |
| | 62 | 16X | 9X | 2.07X | X | ○ | — |
| | 63 | 22X | 14X | 1.35X | X | ○ | — |
| | 64 | 19X | 10X | 1.07X | ○ | 7 | — |
| | 65 | 30X | 16X | 3.07X | X | ○ | — |
| | 66 | 28X | 18X | 4.01X | X | ○ | — |

Example Nos. 1 to 53 are examples that each have a wire composition containing graphite by 0.16 to 2.00 mass % (on the basis of the total wire mass) and iron powder by 20 mass % or more iron powder (on the basis of the total flux mass) in the flux, thereby satisfying the scope of the present invention. In the pure Ar shielding gas, the respective flux-cored wire produces a stable ark and less spark, and is excellent in the linearity of the weld bead. Consequently, welding having stability similar to either $CO_2$ gas shielded welding or Ar+$CO_2$ gas shielded welding can be performed. Further, since $CO_2$ gas is not used, the wires are capable of contributing to global warming prevention.

Among the examples, Examples Nos. 1 to 20, 22 to 35, an 38 to 53 each contains at least one element selected from a group consisting of Ti and Zr by 0.03 to 5.00 mass %. According to the respective examples, the ark is further stable, so that the examples are even more suitable for use.

Further, among the examples described above, Example Nos. 1 to 20, 23 to 25, and 27 to 35 are wires that are each controlled to contain, on the basis of the total wire mass, C: 0.16 to 2.00 mass %;
Si: 2.00 mass % or less;
Mn: 10.00 mass % or less;
Al: 1.00 mass % or less;
Mg: 1.00 mass % or less;
Ni: 3.00 mass % or less;
Cr: 3.00 mass % or less;
Nb: 3.00 mass % or less;
V: 3.00 mass % or less;
Mo: 3.00 mass % or less;
Cu: 3.00 mass % or less;
B: 0.0200 mass % or less;
rare earth metals (REM): 0.50 mass % or less;
F: 0.50 mass % or less;
Ca: 0.50 mass % or less;
K, Na, and/or Li: at least one element selected from a group of the elements having a total amount of 1.00 mass % or less;
P: 0.030 mass % or less (as an impurity); and
S: 0.030 mass % or less (as an impurity). According to the respective examples, the bead profile and the crack resistance property are further improved, so that the examples are even more suitable for use.

Further among the examples described above, Example Nos. 2, 6 to 8, 10 to 15, 17, 19, 20, 23 to 25, and 27 to 35 are wires controlled to contain C in the amount of 0.45 to 2.00 mass % on the basis of the total wire mass. According to the respective examples, the joint fatigue strength is increased, so that the examples are even more suitable for use.

Nos. 54 to 66 are comparative examples.

Comparative Example Nos. 54 to 58 each contain a small amount of graphite, and are each equivalent to a general $CO_2$ gas shielded welding wire or Ar+$CO_2$ gas shielded welding wire. In the pure Ar atmosphere, because of the small amount of graphite, the arc was not stabilized, the weld bead was formed to meander, and a large amount of the spatter 171 was generated, thereby to substantially disable welding, as conventionally known.

In the case of Comparative Example No. 59, the contents of graphite and C are excessive. Hence, the arc force was excessively increased, thereby to cause a large amount of the spatter 171 and to frequently cause cracking.

In the case of Comparative Example Nos. 60 to 62, while the amount of graphite is satisfied, the iron powder percentage in the flux is excessively small. Hence, the ark was unstable, the weld bead was formed to meander, and a large amount of the spatter 171 was generated.

Comparative Example No. 63 is one of flux-cored wires generally commercially available. The amount of graphite and the iron powder percentage are both excessively small. Hence, the ark was unstable, the weld bead was formed to meander, and a large amount of the spatter 171 was generated, thereby substantially disabling welding, as conventionally known.

In the case of Comparative Example No. 64, the contents of graphite and C are excessively high and iron powder percentage are excessively low. Hence, the ark was unstable, a large amount of the spatter 171 was generated, and cracking frequently occurred.

Comparative Example Nos. 65 and 66, respectively, are solid wires. In the case of the solid wire, either graphite or iron powder cannot be added in the original forms, such that welding was impossible in the pure Ar atmosphere.

Although not shown in the table, when welding was executed using a wire of Example No. 30 and an Ar 90 volume %+$CO_2$ 10 volume % shielding gas, the arc stability was low, a large amount of fume was generated, and the joint fatigue strength was less than 200 MPa and improved. Hence, it was verified that the pure Ar shielding gas is optimal for the present welding wire, and the pure Ar gas shielded welding wire is well suitable for improving fatigue stress of weld joint.

According to the present invention, and more specifically, in MIG welding method using pure Ar, there is no oxygen source from other sources than the wire components. Hence, even when a large amount of graphite is added, the amount of fume caused by carbon oxide reaction is very small, and slag caused by silicon, manganese, and titanium oxides reaction almost does not occur. When the C content is increased to 0.45 mass % or more, the arc stability can be improved. Further, the Ms point is further lowered as the amount of oxygen in the iron is smaller. According to the present embodiments and examples, since the amount of oxygen of the weld metal is as small as some 10 ppm, the effect of C can be further increased, and the improvement effect of the fatigue strength can be increased by further lowering the Ms point. Further, since the oxide working as an inclusion almost does not exist, there is a correlated effect that solidification cracking is less likely to occur.

What is claimed is:

1. A MIG arc welding method, comprising MIG welding using a flux-cored wire formed with a steel outer sheath filled with a flux, said flux-core wire comprising in said flux, graphite: 0.16 to 2.00 mass % on the basis of a total flux-core wire mass; and iron powder: 20 mass % or more on the basis of a total flux mass, wherein
    a pure Ar gas conforming to JIS K 1105 Class 1 or 2 is used as a shielding gas, and an arc is generated between the wire set to a positive pole and a base metal set to a negative pole,
    wherein said iron powder has an Fe concentration of 95 mass % or more and a granularity of 500 μm or less.

2. The MIG welding method as defined in claim 1, further comprising in said flux, at least one element selected from a group of Ti and Zr in an amount of 0.03 to 5.00 mass % on the basis of the total flux-core wire mass.

3. The MIG welding method as defined in claim 1, further comprising, on the basis of the total flux-core wire mass, C: 0.16 to 2.00 mass %; Si: 2.00 mass % or less; Mn: 10.00 mass % or less; Al: 1.00 mass % or less; Mg: 1.00 mass % or less; Ni: 3.00 mass % or less; Cr: 3.00 mass % or less; Nb: 3.00 mass % or less; V: 3.00 mass % or less; Mo: 3.00 mass % or less; Cu: 3.00 mass % or less; B: 0.0200 mass % or less; rare earth metals (REM): 0.50 mass % or less; F: 0.50 mass % or less; Ca: 0.50 mass % or less; K, Na, and Li: at least one element selected from a group of the elements having a total amount of 1.00 mass % or less; P: 0.030 mass % or less as an impurity; and S: 0.030 mass % or less as an impurity.

4. A MIG welding method as defined in claim 1, wherein a pulsed power source is used as a power source that forms the arc.

5. A MIG welding method as defined in claim 1, wherein the base metal is a steel sheet having a tensile strength of 490 MPa or more.

6. The MIG welding method as defined in claim 3, wherein, the content of C is 0.45 to 2.00 mass % on the basis of the total flux-core wire mass.

* * * * *